(12) United States Patent
Rasch

(10) Patent No.: US 6,817,431 B1
(45) Date of Patent: Nov. 16, 2004

(54) SUSPENSION FOR A SUBASSEMBLY THAT PRODUCES, RECEIVES AND/ OR TRANSMITS TORQUE IN THE DRIVE TRAIN OF A MOTOR VEHICLE

(75) Inventor: Reinhard Rasch, Hechendorf (DE)

(73) Assignee: Continental ISAD Electronic Systems GmbH & Co. oHG, Landsberg/Lech (DE)

( * ) Notice: Subject to any disclaimer, the term of this patent is extended or adjusted under 35 U.S.C. 154(b) by 0 days.

(21) Appl. No.: 09/806,169

(22) PCT Filed: Aug. 12, 1999

(86) PCT No.: PCT/EP99/05853

§ 371 (c)(1),
(2), (4) Date: Oct. 1, 2001

(87) PCT Pub. No.: WO00/19585

PCT Pub. Date: Apr. 6, 2000

(30) Foreign Application Priority Data

Sep. 30, 1998 (DE) .......................................... 198 45 019

(51) Int. Cl.[7] .............................................. B60K 06/04
(52) U.S. Cl. ....................................... 180/65.2; 310/51
(58) Field of Search .............................. 180/65.2, 65.3, 180/65.4, 65.6; 290/52; 310/51, 91

(56) References Cited

U.S. PATENT DOCUMENTS 5,670,838 A * 9/1997 Everton ...................... 310/254
6,184,603 B1 * 2/2001 Hamai et al. ............. 310/75 R
6,208,036 B1 * 3/2001 Evans et al. .................. 290/46
6,364,042 B1 * 4/2002 Joachim ..................... 180/65.2
6,437,467 B1 * 8/2002 Schierling et al. ............ 310/51
6,455,968 B2 * 9/2002 Honorio et al. ......... 310/102 R
6,481,517 B1 * 11/2002 Kobayashi et al. ........ 180/65.3
6,484,596 B2 * 11/2002 Puchas ............................ 74/6
6,492,742 B1 * 12/2002 Fujikawa et al. ......... 290/40 C

* cited by examiner

Primary Examiner—Bryan Fischmann
Assistant Examiner—Jeffrey Restifo
(74) Attorney, Agent, or Firm—Pierce Atwood

(57) ABSTRACT

A suspension for an assembly generating, absorbing, and/or transmitting torque in the drive train of a motor vehicle with a combustion engine, with the assembly 10 including materials with a thermal expansion coefficient different from the material of the engine block of the combustion engine 12, and a first non-rotating part 18, 22 of the assembly 10 being connected with the engine block, and a second rotating part 16 of the assembly 10 being connected with an output shaft 14 protruding from the engine block, and with the first and the second part 18, 22; 16 being designed so as to encompass the output shaft 14 at least partially, and with the first non-rotating part 18, 22 of the assembly 10 being connected with the engine block of the combustion engine 12 via a coupling element 40 in a manner so as to be essentially secured against rotation and resilient in the radial direction.

11 Claims, 5 Drawing Sheets

SUSPENSION FOR A SUBASSEMBLY THAT PRODUCES, RECEIVES AND/ OR TRANSMITS TORQUE IN THE DRIVE TRAIN OF A MOTOR VEHICLE

BACKGROUND OF THE INVENTION

The present invention relates to a suspension for an assembly generating, absorbing, and/or transmitting torque in the drive train of a motor vehicle. In particular, the invention relates to a suspension of an electric motor between the engine block of a combustion engine and the transmission housing of a downstream manual or automatic transmission. The electric motor then optionally serves as a starter of the combustion engine, as a charging generator for the automobile battery, as a torsional-vibration absorber of the combustion engine, or, with the combustion engine shut down, as an electric drive. This concept has been explained under differently weighting the individual aspects in a number of patent applications (e.g. DE 33 06 481, DE 44 06 482, DE 44 47 537, DE 44 47 574, DE 195 32 135, DE 195 32 128, DE 195 32 136, DE 195 32 163, DE 195 49 259, DE 195 32 164, DE 32 129 filed by Clouth Gummiwerke AG, Cologne, Germany).

Therein, the drive arrangement is generally designed in such a manner that the combustion engine and the electric motor act on a common output shaft which leads to a manual or automatic transmission.

In the state of the art, arrangements are known (see e.g. DE 32 20 950 C2) where a stator back of the electric motor (with a stator, a stator winding, and a rotor which can be coupled secured against rotation onto the output shaft of the combustion engine) is screwed via a stator carrier between an output flange of the combustion engine and a housing of the transmission. Thereby, no force-related decoupling takes place between the stator back and the clamping of the stator carrier between the engine block/transmission housing.

The situation, however, that modern vehicles have transmission housings as well as engines blocks of the combustion engine, which consist of aluminium alloys, while electric motors (in particular the stator) have a very high proportion of iron, gives rise to considerable problems. The thermal expansion coefficient of aluminium is approximately twice that of iron. In addition, considerable temperature differences occur between the electric motor and the combustion engine, depending on the mode of operation. The temperature variations, too, to which such a drive unit of a motor vehicle is subjected due to the operating temperature and the ambient conditions are in the range from approx. −50° C. to approx. +200° C.

The different thermal expansion coefficients of the two materials and the temperature variations cause expansions/contractions, which may influence the stator of the electric motor (changes of the air gap, getting out of roundness, etc.) and/or the combustion engine/transmission unit (deformation of flanges, stress cracks, jamming of pistons, etc.).

SUMMARY OF THE INVENTION

Starting from these assumptions the invention is based on the object to provide a suspension for an assembly generating, absorbing, and/or transmitting torque in the drive train of a motor vehicle, in which the above mentioned problems do not occur.

In order to eliminate this problem the following inventive solution is proposed: a suspension for an assembly generating, absorbing, and/or transmitting torque in the drive train of a motor vehicle with a combustion engine, with a first non-rotating part of the assembly being connected with the engine block via a coupling element in a manner so as to be essentially secured against rotation, and a second rotating part of the assembly being connected with an output shaft protruding from the engine block, and with the first and the second part being designed so as to encompass the output shaft at least partially, characterised in that the assembly comprises materials with a thermal expansion coefficient different from that of the material of the engine block of the combustion engine, and the coupling element is highly resilient in the radial direction so that it is readily deformed under thermal expansion/contraction.

With this configuration of the suspension, reactions of the expansion of the first non-rotating part on the attachment at the engine block are virtually completely eliminated in a space saving and stable manner. The rigidity of the arrangement in the corresponding directions or degrees of freedom, respectively, can be established according to the requirements, in that the material properties and dimensions or resilience, respectively, are appropriately dimensioned.

In the following, several developments and particularly advantageous configurations or embodiments, respectively, of this inventive principle will be explained.

The invention can be employed particularly effectively if the assembly is an electric motor, preferably an asynchronous motor, with the first non-rotating part being the stator and the second rotating part being the rotor of the electric motor.

In a first embodiment of the invention the coupling element is a disk which extends in an essentially radial direction, at which at least one flange is formed oriented essentially coaxially with the output shaft, which can be deformed in the radial direction, with the disk being connected with the engine block and the flange being connected with the stator. In this manner an arrangement can be realised which is highly rigid against deformation in the axial direction (parallel to the output axis) because the radial dimensions of the disk are to be as small as possible in any case. The same applies for the area of the disk in the radial direction. The flange which at its output end is essentially coaxially oriented and with its free end is connected with the stator allows an expansion/contraction of the stator relative to the engine block due to temperature effects or differences and to the different thermal expansion coefficients. In this context, the rigidity or resilience of the suspension in the radial direction can be established as a function of the choice of material and the dimensioning of the flange.

In a particularly preferred embodiment of the inventive suspension at least one radially oriented web which is arranged at least along a portion of the circumference of the flange is formed at the end of each flange, which is remote from the disk, which connects the flange with the first non-rotating part of the assembly.

In addition, it is possible that the outer surface of the first non-rotating part of the assembly, the or each flange and the webs define an annular space through which a cooling fluid can flow.

Alternatively, in a preferred embodiment of the invention the disk is formed by two annular joined sheet metal parts at whose radially inner edges a (co-)axially oriented flange each is formed, with a radially oriented web being formed at the edge of same which is remote from the disk.

In another embodiment of the invention the flange is integrally connected with the first non-rotating part of the assembly with the end of same which is remote from the disk. In the case of the electric motor, the non-rotating part of the assembly, for example, is the stator back ring.

In another embodiment of the invention a radially oriented collar is arranged at the outer circumference of the first non-rotating part, which comprises several elongated holes along its circumference, adjacent to which fastening holes are arranged further radially outward, and webs which are resilient in the radial direction are formed further radially inward.

Additional properties, characteristics, advantages, and modifications will become apparent from the following description of the drawing in which embodiments of the invention are illustrated.

DETAILED DESCRIPTION OF THE INVENTION

Figure 1:
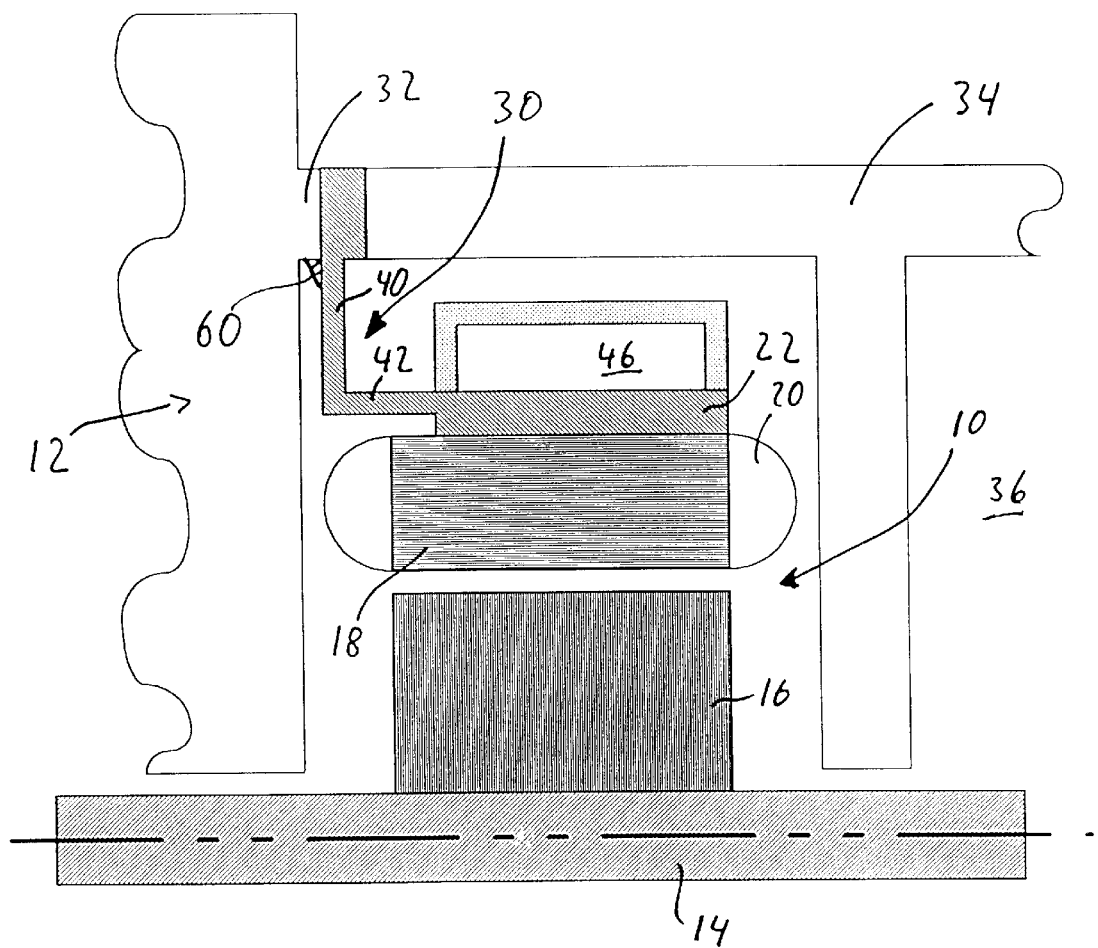
FIG. 1 is a schematic representation of a longitudinal section through a first embodiment of the invention.

FIG. 1 shows a first embodiment of the invention, with a suspension for an asynchronous motor 10 being provided in the drive train of a motor vehicle with a combustion engine 12 (not shown in detail).

The electric motor 10 comprises a rotor 16 which is arranged secured against rotation on the output shaft 14 of the combustion engine 12, and a stator 18 (with an indicated stator winding 20) surrounding the rotor. The stator is surrounded by a shrunk on annular stator back 22. The electric motor 10 is held centered and secured against rotation by means of a coupling element 30 (which will be explained below in detail) between the output flange 32 of the combustion engine 12 and the housing 34 of an automatic or manual transmission 36 (not shown in detail). The electric motor 10 essentially consists of iron (and copper windings), while the engine block of the combustion engine and the housing 34 of the transmission 36 consist of an aluminium alloy, with the two materials having different thermal expansion coefficients. This is the reason why the coupling element 30 causes the non-rotating stator 18 or the stator back 22, respectively, which is securely connected with same to be connected with the engine block of the combustion engine 12 in such a manner that it is essentially secured against rotation and resilient in the radial direction.

For this purpose, the coupling element 30 comprises a (circular) annular disk 40 which extends essentially in the radial direction, at whose radial inner edge at least one flange 42 is formed which is essentially coaxially oriented relative to the output shaft 14 and deformable in the radial direction. The annular disk 40 with its radial outer marginal area is clamped (by means of screw fastenings, not shown) between the output flange 32 of the engine block of the combustion engine 12 and the housing 34 of the transmission 36. In the present embodiment, the edge of the flange 42, which is remote from the annular disk 40, is integrally joined with the stator back 22. Alternatively, the edge of the flange 42, which is remote from the annular disk 40, can be joined with the stator 18 or the stator back 22 by means of screw fastening, riveting, bonding, welding, or the like.

The flange 42 is preferably a thin flexible sheet metal ring which, for example, is manufactured by deep-drawing as an integral part with the annular disk 40. In addition, the flange 42 is dimensioned in the axial direction in such a manner that with a thermally induced expansion of the stator 18 or the stator back 22, respectively, the annular flange 42 can expand conically, with its margin adjacent to the stator back 22 having a larger diameter than its margin adjacent to the annular disk 40.

Figure 2:
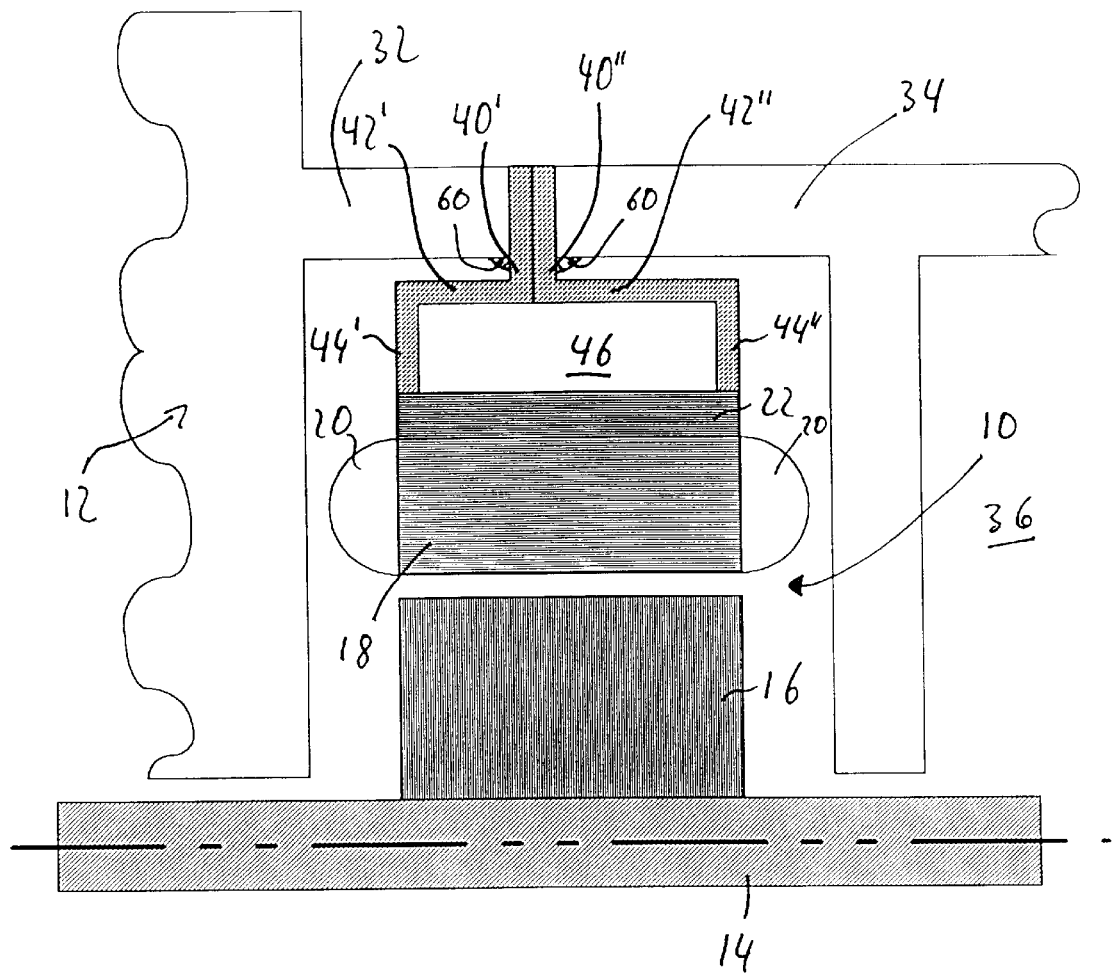
FIG. 2 is a schematic representation of a longitudinal section through a second embodiment of the invention.

In the embodiment according to FIG. 2, identical components or identically acting components are assigned the same reference numerals as in FIG. 1 and are not explained again. An essential difference from the embodiment according to FIG. 1 is that not only one annular disk 40 and one (tubular) flange 42 formed thereon are provided, but two annular disks 40', 40" and two flanges 42', 42", respectively, which are arranged "back-to-back". Moreover, along the respective flange 42', 42" a radially oriented web 44', 44" is formed at the end of each flange 42', 42" which is remote from the disk 40', 40", which connects the respective flange 42', 42" with the stator back 22. To this end, the web 44', 44" is continuously welded to the outer margin of the stator back 22.

In this manner, the outer surface of the stator back 22, the flanges 42', 42", and the webs 44', 44" define an annular space 46 through which a cooling fluid can flow (via not shown inlets and outlets).

Figure 2A:
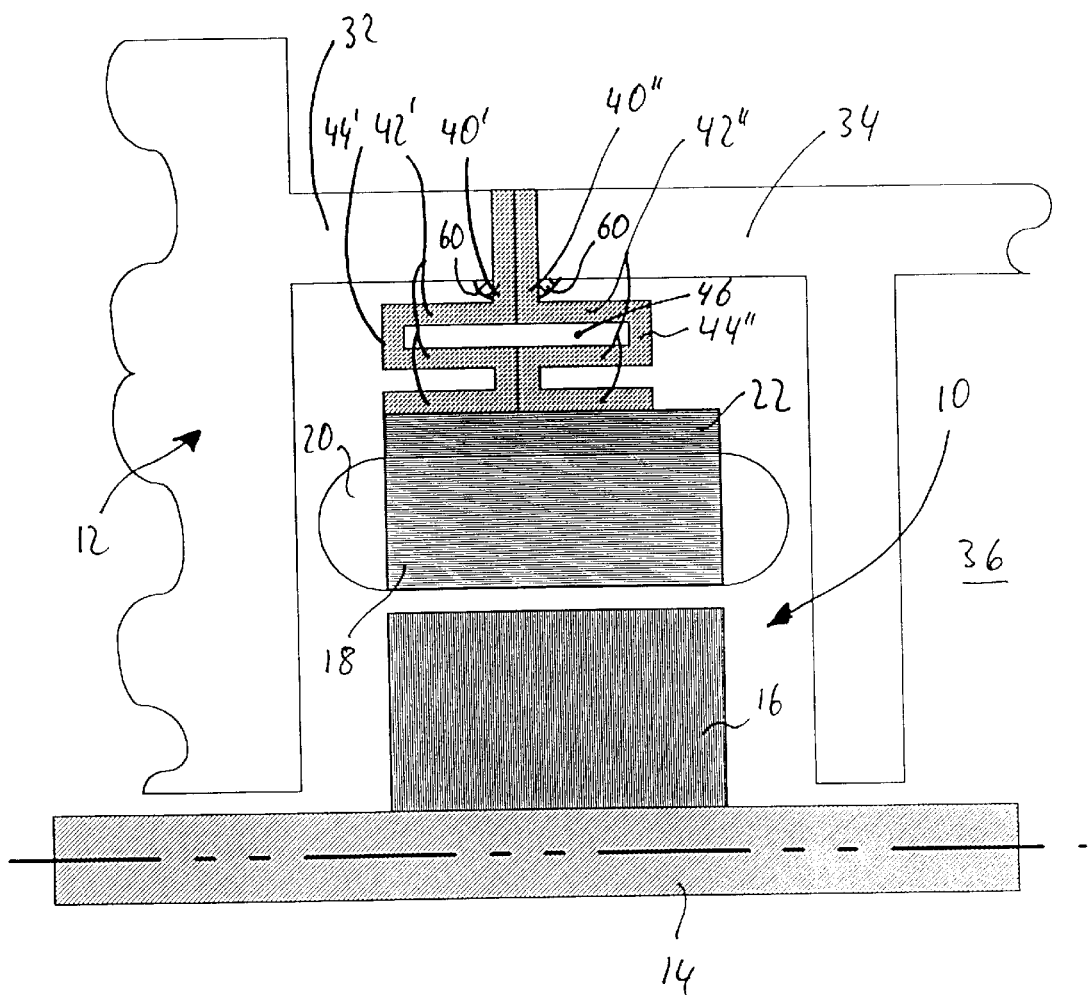
FIG. 2A is a schematic representation of a longitudinal section through a third embodiment of the invention.

The two flanges 42', 42" are dimensioned in such a manner that with a thermally induced expansion of the stator 18 or the stator back 22, respectively, the flanges 42', 42" expand funnel-shaped in the radial direction in the area of the webs 44', 44", and in the case of a thermally induced contraction of the stator 18 or the stator back 22, respectively, the flanges 42', 42" taper radially in the area of the webs 44', 44" in the opposite direction. In addition to the embodiment according to FIG. 2 in which the flanges 42', 42" are shown with different widths, the two flanges 42', 42" can also be of the same width. This is realised in the modified embodiment of FIG. 2A. In addition, in this embodiment the effective width of the flanges 42', 42" is extended in that they are folded S-shaped or Z-shaped, respectively.

Figure 3:
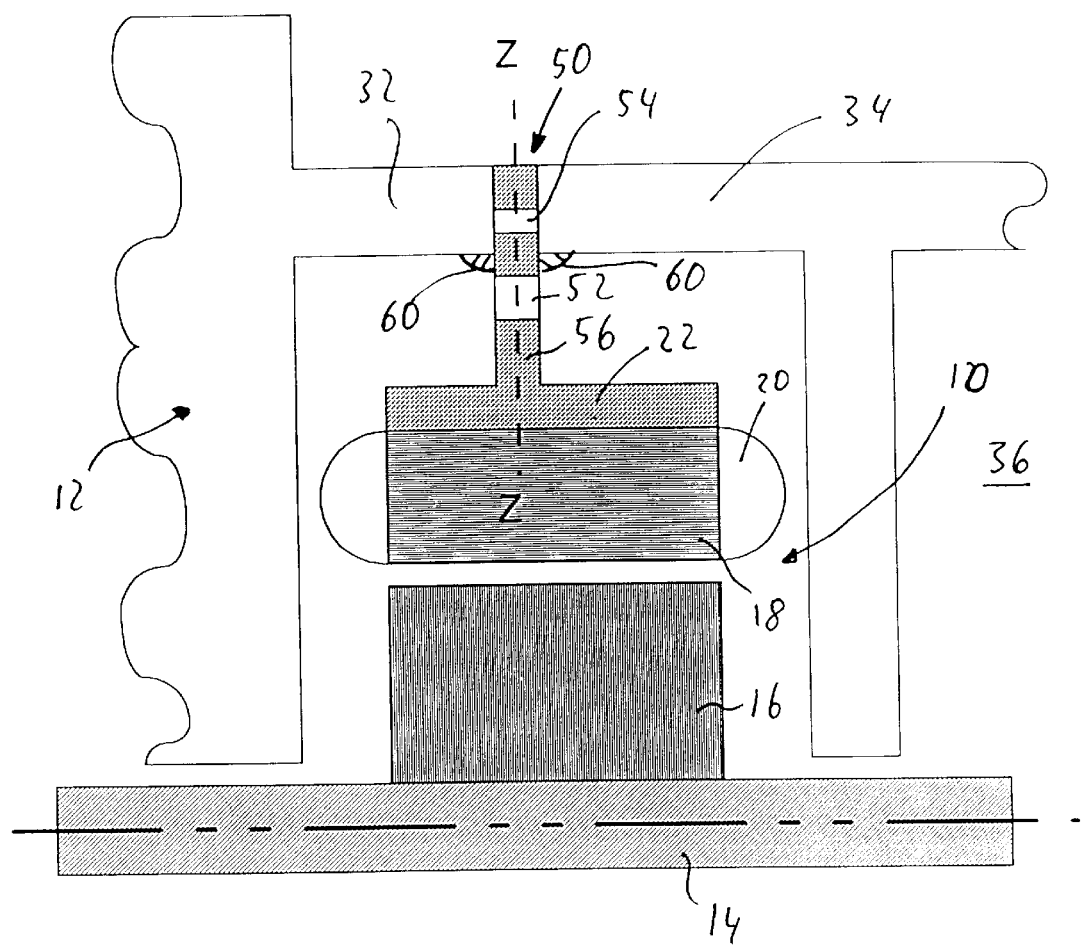
FIG. 3 is a schematic representation of a longitudinal section through a fourth embodiment of the invention.
Figure 4:
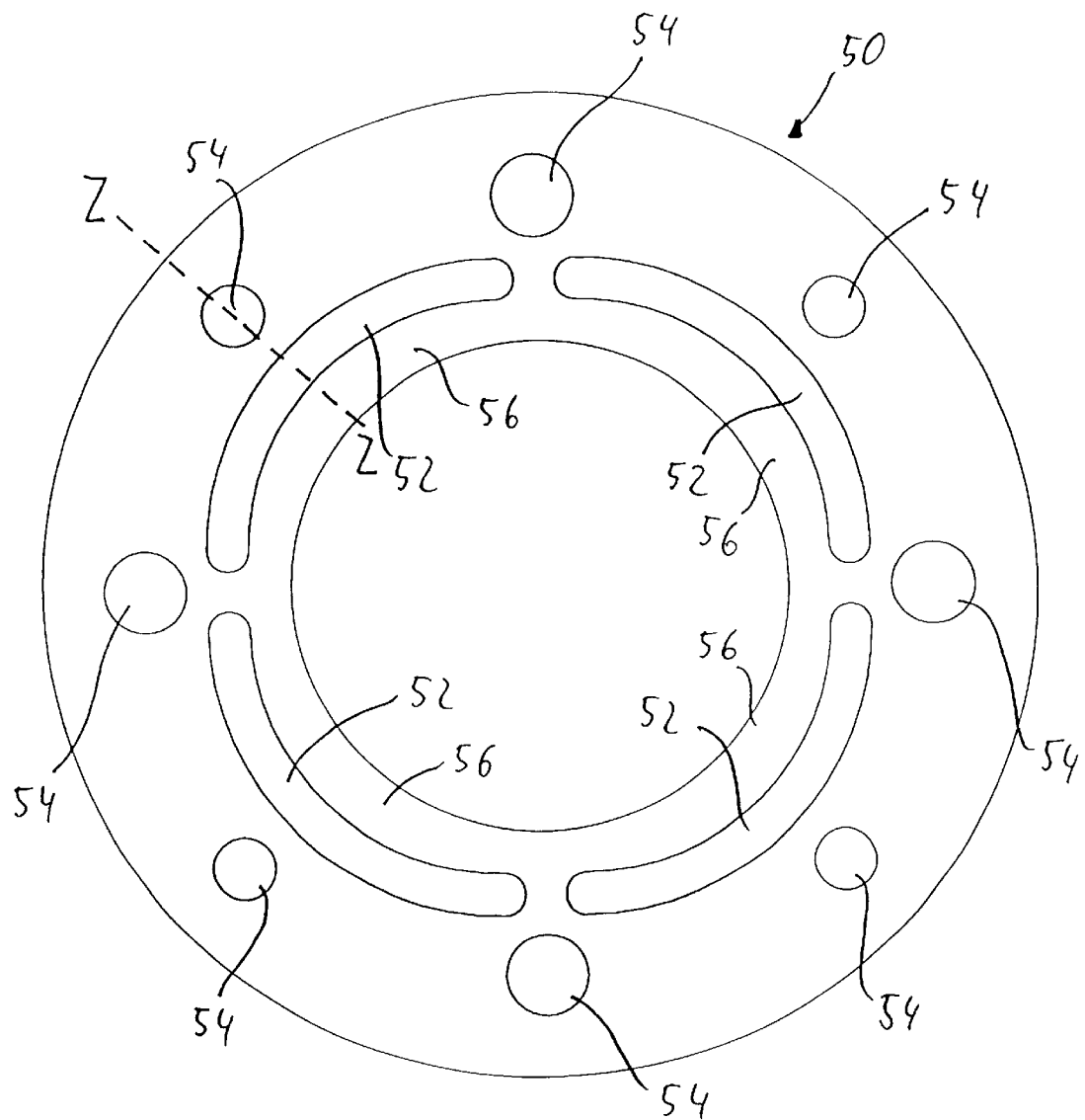
FIG. 4 is a schematic representation of a plan view of the inventive suspension along line Z-Z in FIG. 3.

In another embodiment shown in FIG. 3, a radially oriented collar 50 as the coupling element is formed at the outer circumference of the stator back 22. In lieu of the tubular resilient flanges of the previous embodiments of FIGS. 1, 2, and 2A, the collar 50 of the embodiment according to FIGS. 3 and 4 is provided with several ring segment-shaped elongated holes 52 along its circumference, adjacent to which holes 54 are arranged further radially outward, and webs 56 further radially inward which are resilient in the radial direction (see also FIG. 4).

The area between two neighbouring elongated holes 52 serves to radially and axially support the electric motor at the output flange 32 of the engine block of the combustion engine 12, while the webs 56 ensure the radial resilience for a expanding/contracting stator (back) 18 (22) caused by temperature variations. For an increase in resilience, one hole each (formed as round or elongated holes) can be provided radially further outward in the area between two neighbouring elongated holes 52 (see FIG. 4).

It is understood that an additional cooling channel can be provided in this case at the outside of the stator back 22 as in the previous embodiments.

Should the need arise, a centering band 60 can be provided additionally in all embodiments. In lieu of the centering band(s) 60 it is also possible to use clamping sleeves for centering purposes.

The sheet metal used in the manufacture of the coupling elements should be sufficiently soft or elastic, respectively, that it deforms (expands/contracts) readily under heat expansion/contraction. For this purpose, stainless steel sheet metal, copper sheet metal, or the like can be used.

Regardless of the concrete configuration as it is illustrated by the embodiments according to FIGS. 1 to 4, the inventive solution is highly rigid against torsional moments or axially oriented moments, while it is highly resilient against radially oriented forces due to thermally induced expansions/contractions of the electric motor relative to the output flange or the housing, respectively, of the transmission. In addition, the inventive solution also provides for a centered mounting and positioning of the stator relative to the rotor or the output shaft, respectively, of the combustion engine.

The stator back 22 may project beyond the windings 20 of the stator 18 and beyond the rotor 16 in the axial direction and comprise a cover of the winding 20 at both ends, which extends radially inward. This also realises a safe winding protection.

What is claimed is:

1. A suspension for an assembly generating, absorbing, and/or transmitting torque in a drive train of a motor vehicle with a combustion engine having an engine block, with
    a first non-rotating part (18, 22) of the assembly (10) being connected with the engine block of the combustion engine (12) via a coupling element (40; 50) in a manner so as to be essentially secured against rotation, and a second rotating part (16) of the assembly (10) being connected with an output shaft (14) protruding from the engine block, and with
    the first and the second part (18, 22; 16) being designed so as to encompass the output shaft (14) at least partially, characterized in that
    the assembly (10) comprises materials with a thermal expansion coefficient different from that of the material of the engine block of the combustion engine (12), and
    the coupling element is a disk (40) which extends in an essentially radial direction, at which at least one flange (42) is formed oriented essentially coaxially with the output shaft (14), which can be deformed in the radial direction, with the disk (40) being connected with the engine block and the flange (42) being connected with the first non-rotating part (18), the coupling element (40; 50) thereby being is resilient in the radial direction so that it is readily deformed under thermal expansion/contraction.

2. The suspension according to claim 1, characterized in that
    the assembly is an electric motor (10) with the first non-rotating part being a stator (18) and the second rotating part being a rotor (16) of the electric motor.

3. The suspension according to claim 2, characterised in that
    at least one radially oriented web (44) which is arranged at least along a portion of the circumference of the flange is formed at the end of each flange (42), which is remote from the disk (4), which connects the flange (42) with the first non-rotating part (18) of the assembly (10).

4. The suspension according to claim 3, characterised in that
    the outer surface of the first non-rotating part of the assembly, the end of each flange and the webs define an annular space (46) through which a cooling fluid can flow.

5. The suspension according to claim 3, characterised in that
    the disk is formed by two annular joined sheet metal parts at whose radially inner edges an axially oriented flange is formed, with a radially oriented web being formed at an edge of said flange which is remote from the disk.

6. The suspension according to claim 2, characterised in that
    the flange is integrally connected with the first non-rotating part of the assembly with an end of said flange which is remote from the disk.

7. The suspension according to claim 1, characterised in that
    the flange is integrally connected with the first non-rotating part of the assembly with an end of said flange which is remote from the disk.

8. The suspension according to claim 1, characterised in that
    at least one radially oriented web (44) which is arranged at least along a portion of the circumference of the flange is formed at the end of each flange (42), which is remote from the disk (4), which connects the flange (42) with the first non-rotating part (18) of the assembly (10).

9. The suspension according to claim 8, characterised in that
    the outer surface of the first non-rotating part of the assembly, the end of each flange and the webs define an annular space (46) through which a cooling fluid can flow.

10. The suspension according to claim 8, characterised in that
    the disk is formed by two annular joined sheet metal parts at whose radially inner edges an axially oriented flange is formed, with a radially oriented web being formed at an edge of said flange which is remote from the disk.

11. A suspension for an assembly generating, absorbing, and/or transmitting torque in a drive train of a motor vehicle with a combustion engine having an engine block, with
    a first non-rotating part (18, 22) of the assembly (10) being connected with the engine block of the combustion engine (12) via a coupling element (40; 50) in a manner so as to be essentially secured against rotation, and a second rotating part (16) of the assembly (10) being connected with an output shaft (14) protruding from the engine block, and with
    the first and the second part (18, 22; 16) being designed so as to encompass the output shaft (14) at least partially, characterized in that
    the assembly (10) comprises materials with a thermal expansion coefficient different from that of the material of the engine block of the combustion engine (12), and
    the coupling element is a radially oriented collar (50) is arranged at the outer circumference of the first non-rotating part, which comprises several elongated holes (52) along its circumference, adjacent to which holes (54) are arranged further radially outward, an d webs (56) which are resilient in the radial direction are formed further radially inward, the coupling element (40; 50) thereby being resilient in the radial direction so that it is readily deformed under thermal expansion/contraction.

* * * * *